Feb. 28, 1939.    W. L. CLOUSE    2,149,044
CONTROL MECHANISM FOR FORGING MACHINES
Filed Feb. 18, 1936    5 Sheets-Sheet 1

Inventor
WILLIAM L. CLOUSE
By Richey & Watts
Attorneys

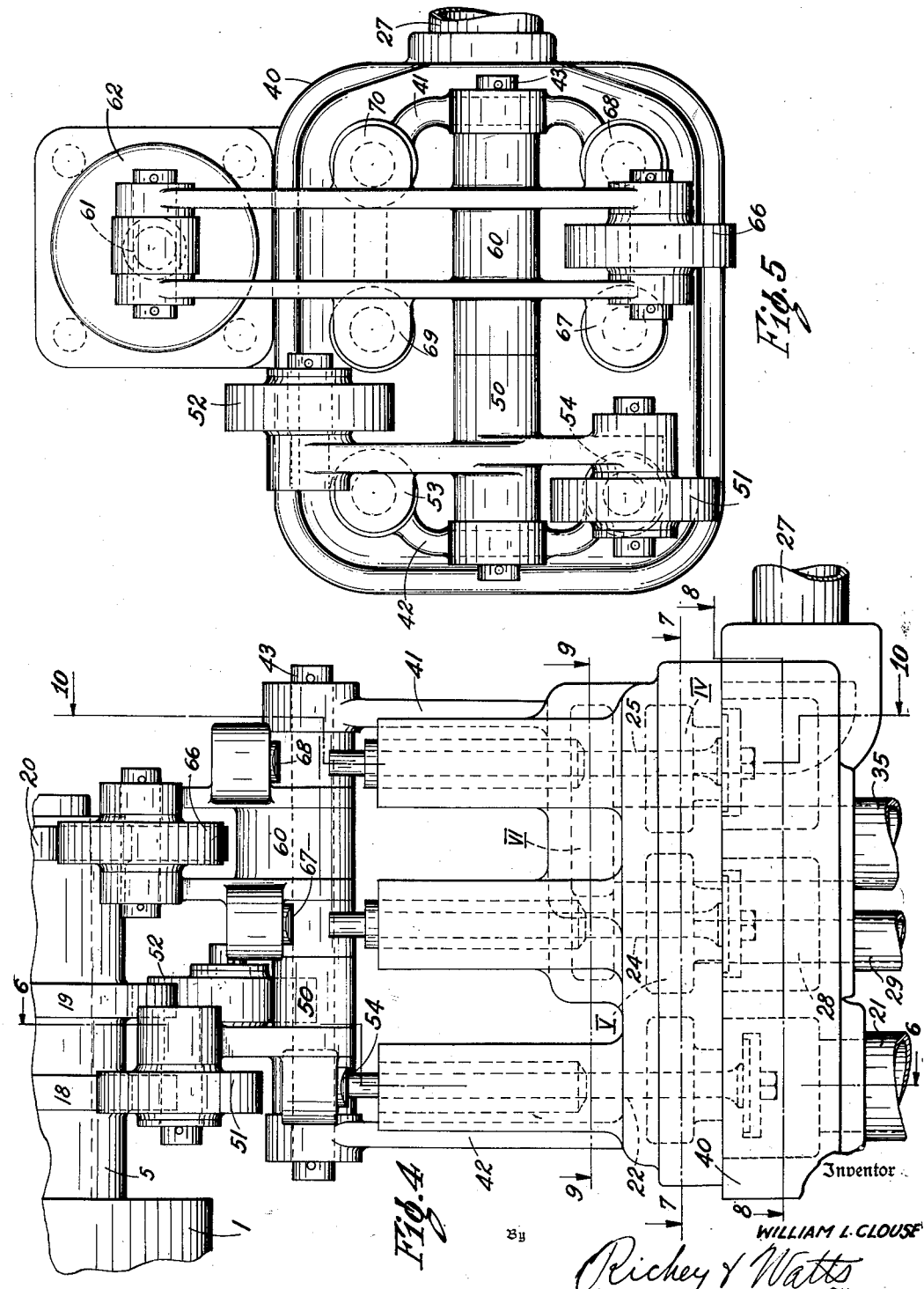

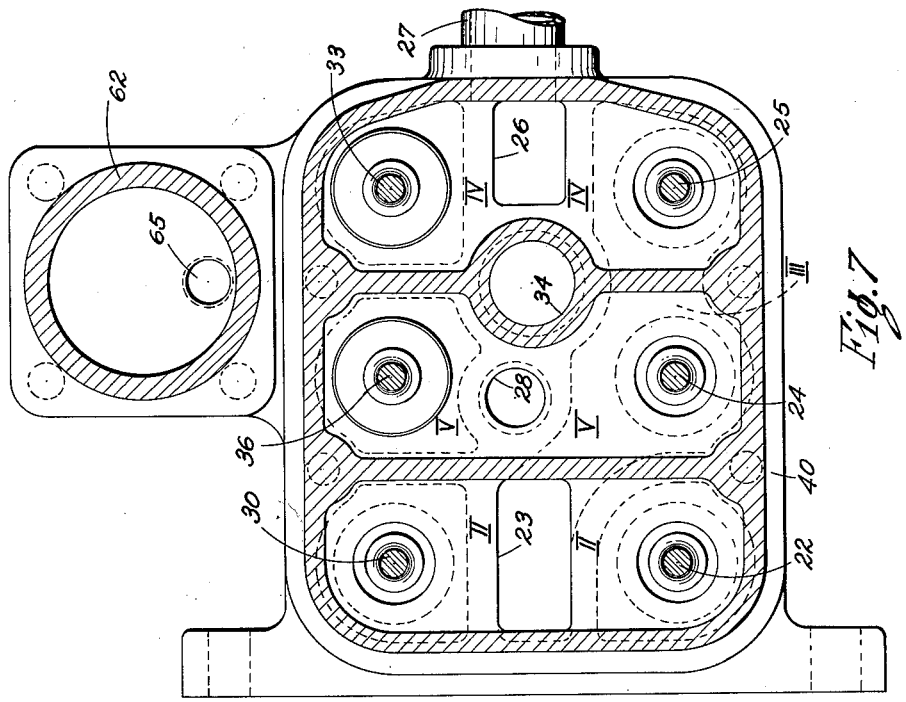
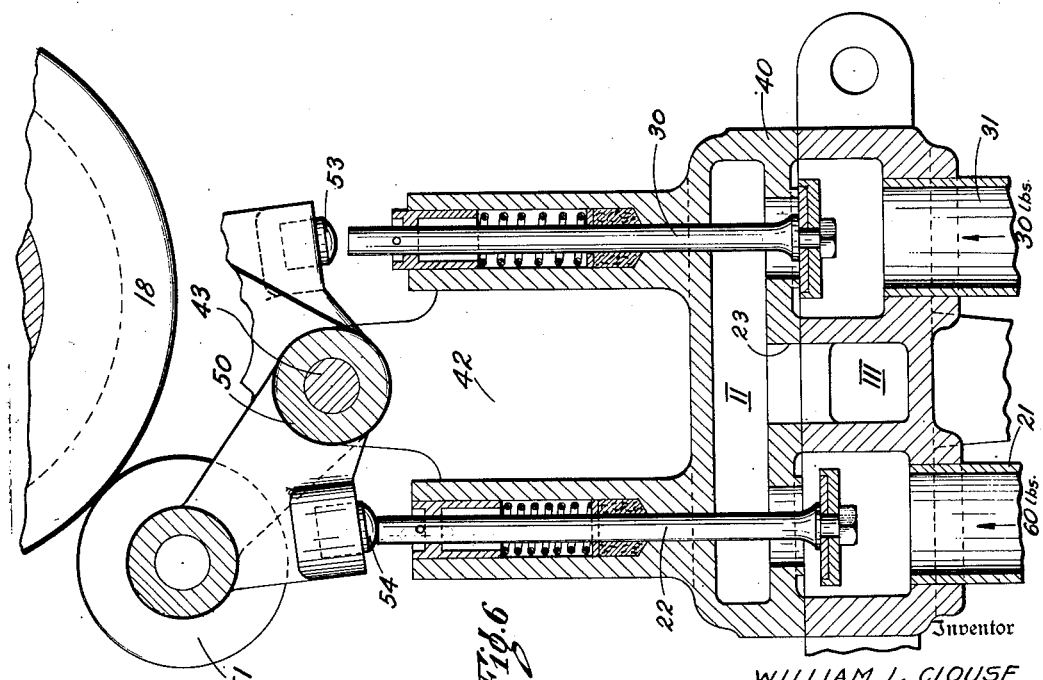

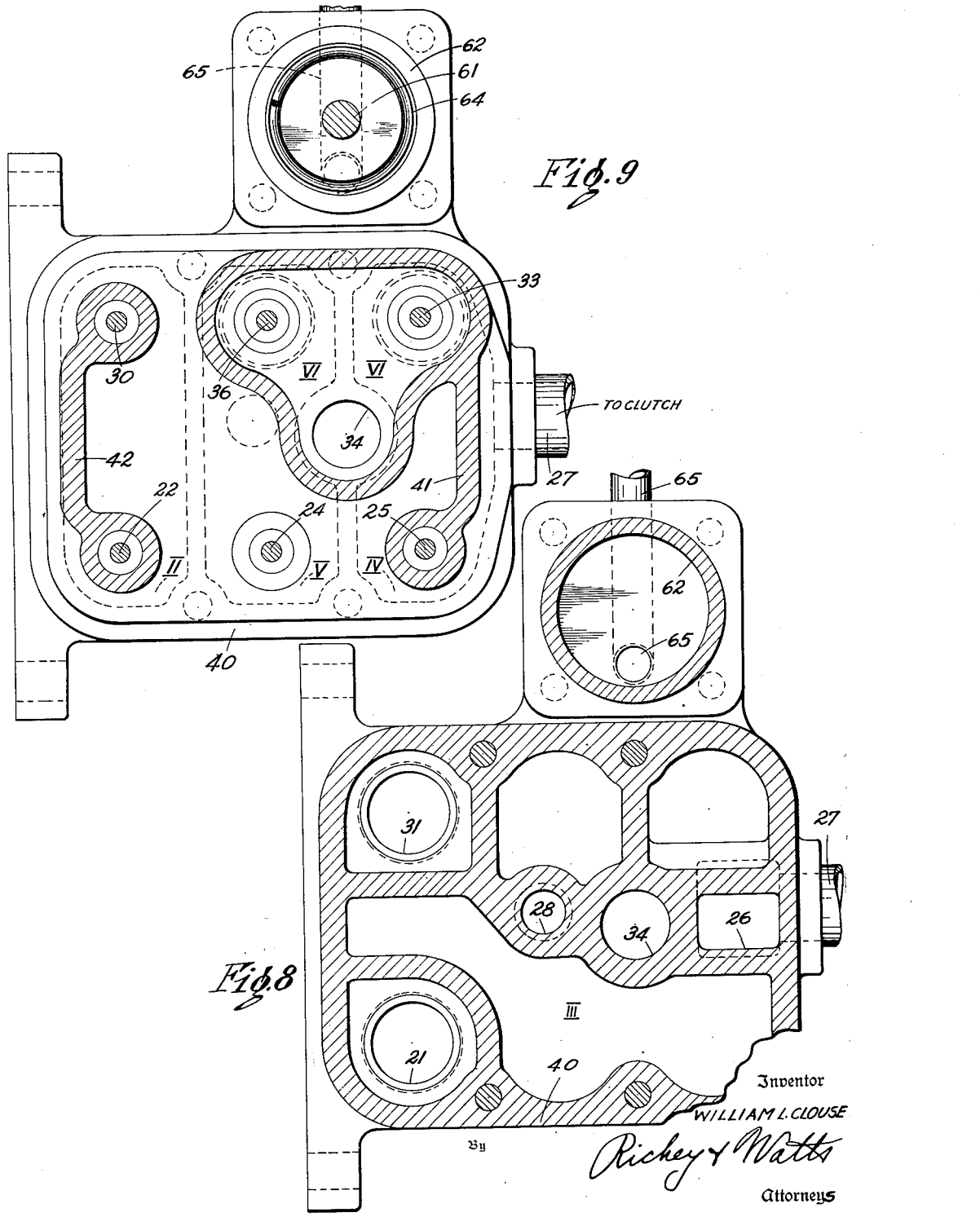

Patented Feb. 28, 1939

2,149,044

UNITED STATES PATENT OFFICE 2,149,044

CONTROL MECHANISM FOR FORGING MACHINES

William L. Clouse, Tiffin, Ohio, assignor to The National Machinery Company, Tiffin, Ohio, a corporation of Ohio Application February 18, 1936, Serial No. 64,531

9 Claims. (Cl. 192—144)

This invention relates to clutch actuating and controlling mechanism particularly adapted for forging machines, presses, and similar single revolution crank operated mechanism.

In heavy duty presses, forging machines and the like it is important that the forces developed during the forging or pressing operations be limited so as to prevent damage or destruction of the machine parts. Since the header slide, flywheel and associated parts in machines of this type are relatively massive and heavy, and since the forces transmitted during forging are considerable and vary throughout the cycle of the machine, numerous failures have attended machine builders' efforts in devising a safety release which will function satisfactory throughout the forging operation.

Friction clutches have heretofore been employed to transmit the torque from the flywheel and thence through the crankshaft and header slide to act upon the work. Although such clutches permit slippage under load, such slippage if extensive adversely effects the material of the engaging clutch parts and therefore should be restricted to overload slippage exclusively as distinguished from slippage during forging. Among the results attending slippage on the clutch faces is that the coefficient of friction is being changed by a "glazing" action on the friction material and by the material itself being worn down and requiring replacement or adjustment. Where a friction clutch is employed to transmit torque to the crankshaft and the crankshaft is equipped with a crank and connecting rod or eccentric device to move the header slide, it will be seen that due to the changing angularity between the eccentric and the driven parts there is a constant change in the torque required to move the header slide. For instance, when the crank is disposed substantially at right angles to the direction of header slide movement (see position S of Figure 2) and the header slide is started forward on a forging stroke, greater torque will be required to advance the header slide than when the crank approaches a position in alignment with the header slide (see position indicated at E in Figure 2). It will also be noted in this connection that the greatest mechanical advantage of the crank with respect to the header slide occurs at the forward position of the header slide and hence the greatest forging pressures are developed as the header slide approaches its maximum forward movement. Another factor effecting a torque variation during a cycle of the forging machine is the load imposed by the gripper slide. To efficiently work the metal the grippers should be completely closed prior to the first forging action and thus the load imposed through the gripping dies and associated slide is effective during the initiation of the cycle and thereby increases the need for greater clutch torque-ability at this time.

Where a friction clutch is relied upon to offer relief by slippage upon overload in a forging machine it will be seen that the clutch must be adjusted to have maximum torque ability at the initiation of the forging stroke. If the clutch engaging surfaces are adjusted to slip with a given overload at the beginning of the forging stroke, it will require a much greater overload to slip the clutch as the header slide reaches its most forward position. On the other hand if a clutch is adjusted to slip upon an overload occurring as the header slide reaches its most forward position, said clutch engaging pressure may be insufficient to transmit the maximum torque which is required as the forging stroke is initiated. Since in the absence of other safety release devices it is necessary to adjust the clutch so as to initiate the forging action, it will require an enormous overload to slip the clutch when the header slide reaches its most forward position. Thus with a single clutch engaging pressure available and this pressure sufficiently high to prevent any slippage during forging, overloads high enough to break the machine may occur near the end of the forging stroke without slipping the clutch.

It is among the objects of my invention to provide a clutch mechanism that will have sufficient torque ability to transmit the maximum torque required for forging and yet slip under an overload occurring at any time during the forging stroke and thereby protect the machine against overloads throughout the cycle of operation. It is a further object of my invention to provide a control mechanism for a friction clutch in a forging machine whereby the clutch torque transmitting ability varies with the torque requirements placed upon the clutch by the forging operation. It is a further object of my invention to provide in a forging machine having a header slide and offset crank to actuate the same, a friction clutch having varying clutch engaging pressures. A further object of the invention is to provide a clutch control mechanism for a forging machine in which the ability of the clutch to transmit torque is decreased as the forging tools approach the end of the forging stroke and in which the ability of the clutch to transmit torque is increased when the forging tools are at the beginning of the forging stroke. A further object of the invention is to provide a clutch mechanism for forging machines having a header slide wherein means are moved in timed relation to the header slide to control the clutch engaging pressures. A further object of the invention is to provide a trip mechanism for a clutch control which will automatically vary the clutch engaging pressures. A further object of the invention is to provide a clutch and brake assembly having an automatic trip mechanism which will control the clutch and brake in timed relation. A further object of the invention is to provide an air clutch for a forging machine which is actuated by a relatively high air pressure during one phase of the forging stroke and a relatively low air pressure during another phase of the forging stroke. A further object of the invention is to provide a brake assembly for a forging machine which may be rapidly engaged and disengaged. Further objects and advantages relating to operation and economies of manufacture will become apparent from the following description wherein:

Figure 4 is an elevation of the trip mechanism employed to actuate the clutch and brake assembly;

Figure 5 is a plan view of the trip mechanism of Figure 4;

Figure 6 is a transverse sectional view taken along the line 6—6 of Figure 4;

Figure 7 is a plan view in section taken along the line 7—7 of Figure 4;

Figure 8 is a plan view in section taken along the line 8—8 of Figure 4;

Figure 9 is a plan view partly in section taken along the line 9—9 of Figure 4;

Generally speaking, I have attained the foregoing objects and advantages by arranging a clutch mechanism wherein the clutch engaging pressures are relatively high during the initiation of the forging stroke and are substantially decreased during the forging stroke so that as the header slide reaches its most forward position it will not require an excessive overload to slip the clutch. Air is preferably employed to actuate the clutch and the mechanism for the valves which vary the clutch engaging pressures also controls the air feed to an air brake. The brake and clutch are so coordinated through said mechanism that the brake is automatically released just prior to clutch engagement and is automatically applied subsequent to clutch disengagement. Preferably the valve control mechanism is connected to and operates in timed relation to the crankshaft and header slide movement so that movement of a single treadle control by the operator will in sequence release the brake, apply the highest clutch engaging pressure, decrease the clutch engaging pressure, disengage the clutch and apply the brake to complete the cycle of the forging machine.

Figure 1:
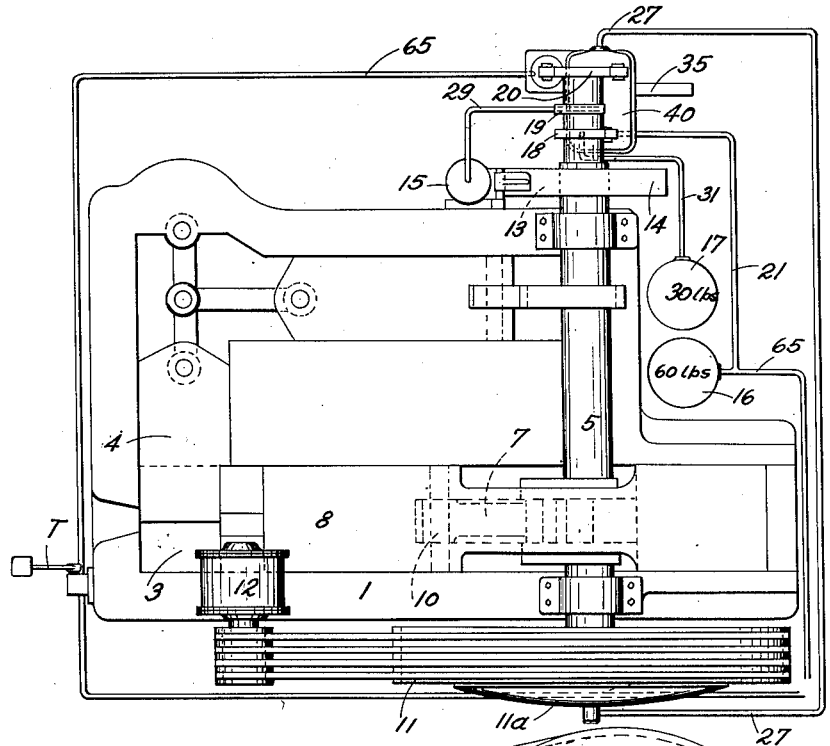
Figure 1 is a plan view of the forging machine provided with a clutch and brake assembly constructed according to my invention.

The clutch mechanism and control therefor constructed according to my invention is shown in Figure 1 mounted upon a forging machine having a bed frame 1, a crankshaft 5 extending transversely thereof and a header slide 8 mounted upon guideways formed in the bed frame. The header slide is preferably provided with a bearing in the bed frame on each side of the crankshaft and is reciprocated in the bed frame by a connecting rod 7 pivoted at 10 to the header slide and to an offset crank on the shaft 5. The bed frame may be provided with a stationary die part 3 and a movable die part 4 actuated by a toggle mechanism in the usual manner. The header slide may be provided with suitable tools to forge the material gripped between the dies, said header slide and toggle mechanism for actuating the movable die being operated from the crank 5 and moved in timed relation thereto. The crankshaft 5 extends beyond the bed frame at one side of the machine and has mounted thereon a clutch and flywheel assembly 11—11a constructed preferably according to that shown in my copending application Serial No. 31,251, filed July 13, 1935.

A motor 12 is mounted adjacent the flywheel and through belts or analogous device rotates the flywheel 11. The driven parts of the clutch 11a are splined to the shaft 5 and rotate the shaft 5 upon clutch actuation as will be better understood from the disclosure in said copending application. According to this embodiment of my invention the crankshaft 5 is projected beyond the bed frame on the side thereof opposite the flywheel and clutch and has mounted thereon through a splined connection a brake drum 13. The brake drum 13 is surrounded by a brake band 14 which is operatively connected to an air brake mechanism, generally indicated at 15. A pair of air tanks 16 and 17 are connected by suitable conduits to an air valve control mechanism arranged beneath the outer end of the crankshaft where said mechanism is operated by a plurality of cams 18, 19 and 20 secured to said shaft.

The tanks 16 and 17 may be supplied with air from an air line or pump and are each adapted through relief valves or the like to contain air at a different pressure. For the sake of convenience the tank 16 will be referred to as a sixty pound air pressure tank and the tank 17 as a thirty pound air pressure tank, although the pressures actually employed may vary considerably from the pressures mentioned depending upon the size and construction of the rest of the machine. The air control mechanism (see Figure 4) comprises a block 40 having a series of chambers and valves designed to lead air from the sixty pound tank and into the clutch and subsequently exhaust the air from the clutch to the thirty pound tank and simultaneously control and actuate the brake.

Referring to Figure 4 the conduit 21 leading from the tank or container 16 admits air at sixty pounds pressure into the lower side of the chambered block 40. Upon actuation of the valve 22 therein by the cam 18 on the crankshaft the air under sixty pounds pressure will be admitted into a chamber II arranged immediately above said conduit 21. The chamber II (see Figure 7) is a narrow rectangular chamber disposed adjacent the bed frame side of the chambered block 40 and is provided with a central aperture 23 which leads downwardly into a chamber III which is beneath the chamber II and disposed substantially at right angles thereto. The chamber III is indicated in phantom outline in Figure 7 and in full plan view in Figure 8. The chamber III is the lowermost chamber at one side of the block 40 and has in its upper wall or ceiling a pair of valves 24 and 25. Assuming that the valve 25 is open at or about the time the sixty pounds air pressure is admitted to chamber III it will be seen that said sixty pounds air may move through valve 25 upwardly into a chamber IV which communicates through opening 26 in the lower wall thereof with a conduit 27 leading to the air clutch 11a at the other side of the machine. The valve 24 which is arranged in the upper wall or ceiling of the chamber III is arranged to be opened just prior to the opening of valve 25. The opening of the valve 24 permits air at sixty pounds to move upwardly into chamber V which is centrally arranged within the trip mechanism at the same level as chamber II. The chamber V is provided in its lower wall or floor with an aperture 28 which leads downwardly to a conduit 29 leading to the brake mechanism. The brake mechanism is actuated by this movement of air to release the brake band 14 and free the brake drum 13.

Figure 2:
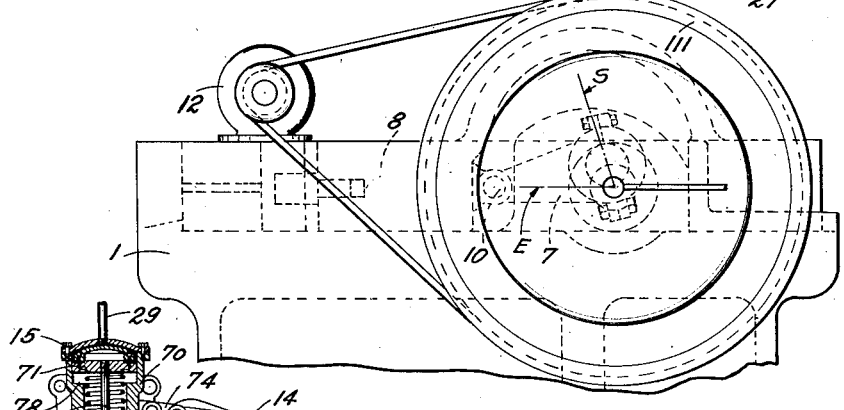
Figure 2 is a side elevation of the machine of Figure 1.
Figure 3:
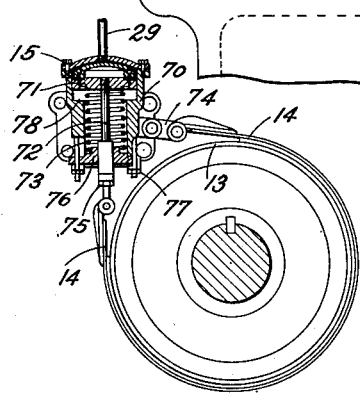
Figure 3 is a sectional elevation of the brake mechanism employed in conjunction with the clutch and trip mechanism on the machine illustrated in Figure 1.

A valve actuating mechanism to be more fully described hereafter is arranged to maintain the valves 22, 24 and 25 positioned as outlined in the preceding paragraph during the major portion of the forging stroke of the header slide. The clutch is, therefore, engaged by a sixty pound pressure during the initiation (see position S of Figure 2) and during that part of the working stroke in which the crank is disposed at substantial angle to the header slide. As the slide approaches its most forward position (see position indicated at E in Figure 2) the valve actuating means above referred to functions to exhaust the sixty pound pressure from the clutch into the thirty pound tank.

To effect the change from sixty pound pressure to thirty pound pressure the valve 22, which admits air at sixty pounds into the chambered valve block 40, is closed, and a valve 30 arranged in the floor of chamber II is opened. The valves 24 and 25 remaining open permit air heretofore held in the brake and clutch mechanism at sixty pounds pressure to pass from the clutch and brake into the chamber III, thence through the passage 23 into chamber II, and thence through conduit 31 to the thirty pound tank. Through the valve actuating mechanism referred to, the clutch remains engaged by a thirty pound pressure during the remainder of the forging stroke and until the header slide is returned by the crank to a "back center" or starting position. The brake is preferably maintained disengaged during this same period by a thirty pound pressure although I appreciate that a higher pressure may be employed to maintain brake release during the entire forging cycle.

As the header slide is being returned to its back center position, as distinguished from the forging position, the valve 25 admitting air at thirty pounds into the chamber IV, is closed, and a valve 33 positioned in the top wall or ceiling of said chamber IV is opened to let the air in the clutch pass upwardly into the chamber VI, which may be referred to as the exhaust chamber, is arranged at the top level in the chambered block 40 (see Figure 9), and is provided with an aperture 34 in its lower wall, which leads exhaust air therefrom into the atmosphere through the exhaust pipe 35. During the release of the clutch by completely exhausting the air therefrom, the thirty pound pressure is still effective to maintain the brake 15 disengaged. Immediately following the clutch release, however, the valve 24, which has heretofore permitted the maintenance of air at thirty pounds pressure in the chamber V, is closed and a valve 36 in the top wall of said chamber is opened to exhaust the air from the chamber V, and consequently the brake 15, into the exhaust chamber VI, and thence to the atmosphere.

Reviewing briefly the valve action outlined above, it will be noted that valves 22, 24 and 25 are opened to effect an engagement of the clutch and a disengagement of the brake with sixty pounds pressure. Thereafter valve 22 is closed, valve 30 is opened, and the clutch and brake exhausted into the thirty pound tank to establish a thirty pound pressure in the clutch and brake. Valve 30 is subsequently closed and the clutch and brake sequentially actuated by exhaustion to the atmosphere through the opening of valves 33 and 36.

The valve actuating structure above referred to comprises a pair of spaced upright brackets 41 and 42 integrally formed with the chambered valve block 40. Said brackets are adapted to support a rocker arm shaft 43 extending generally parallel to the crank shaft 5 and beneath the outer end thereof. A pair of rocker arms 50 and 60 pivotally mounted on the shaft 43 carry valve tappets proportioned and arranged to depress the valves in the order outlined in the above paragraphs.

Figure 10:
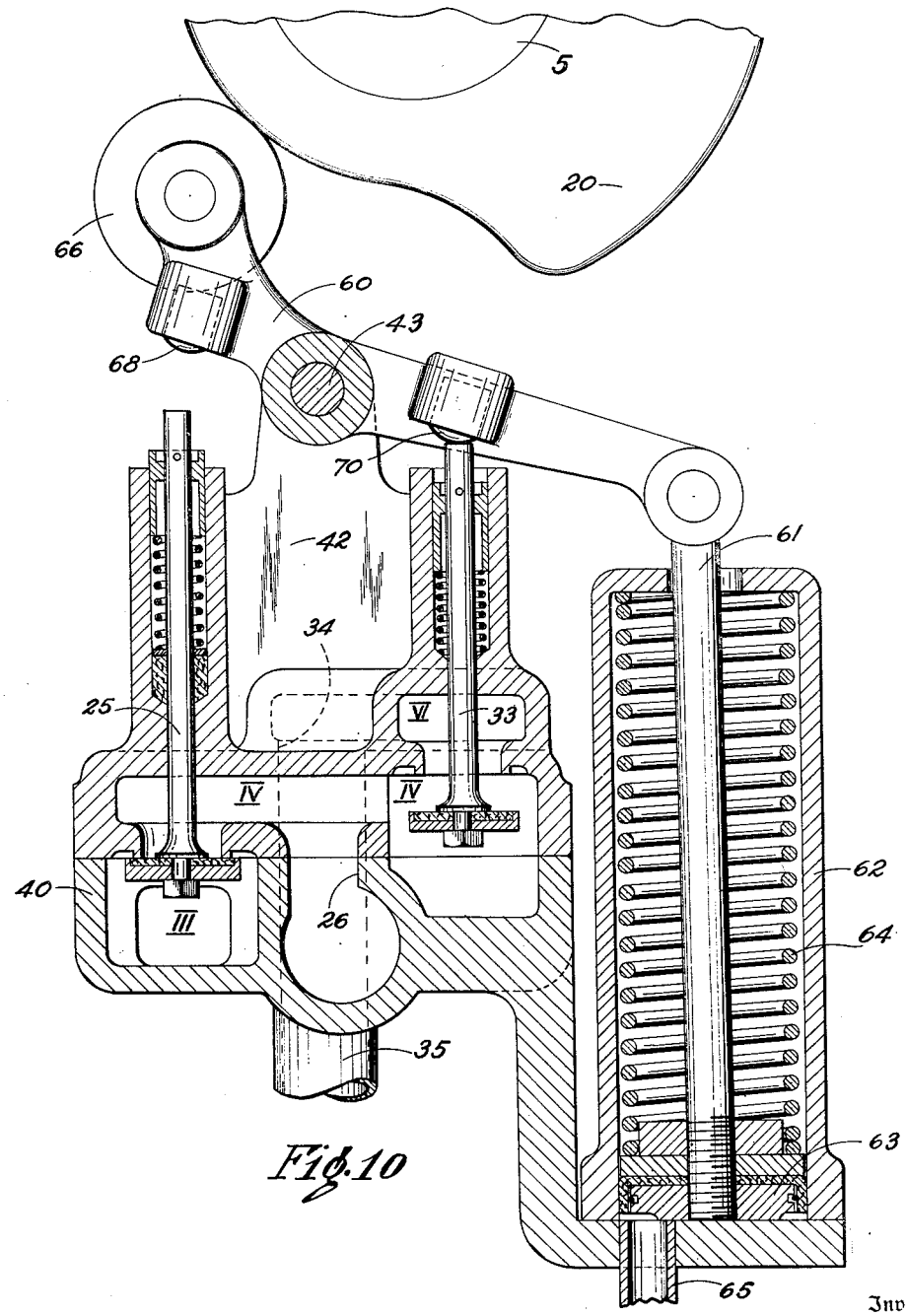
Figure 10 is a transverse sectional view taken along the line 10—10 of Figure 4.

The rocker arm 60, which is the outer rocker arm or most remote from the bed frame of the machine, projects laterally beyond the chambered block 40 and is pivoted at said extended portion to a piston rod 61, which comprises a part of a starting mechanism controlled by the operator (see Figure 10). A cylinder 62 mounted adjacent the chambered valve block 40 is provided with a piston 63 which is normally urged toward one end of the cylinder by an expansion spring 64. A conduit 65 opening into said one end of the cylinder is adapted to admit air from the sixty pound tank 16 through a foot operated treadle mechanism T conveniently positioned at the front or operator's side of the machine. The treadle mechanism is preferably arranged through a valve therein (in a manner not shown) to exhaust the air from the cylinder 62 subsequent to treadle actuation, and in the absence of a cam means, hereafter described, the piston would respond to the urging of spring 64 and return rod 61 to its lower position, as shown in Figure 10.

The rocker arm 60 carries on its end opposite the treadle controlled piston a roller 66 arranged to bear against the outermost cam 20 on the crankshaft 5. Since the crankshaft is being rotated subsequent to the actuation of the rocker arm 60 by the piston 63, the cam 20 may be contoured to depress the roller 66 during a portion of a cycle of the machine. Integrally formed with the rocker arm 60, and projecting laterally therefrom beneath the roller 66, are formed a pair of valve tappets 67 and 68 positioned to engage the stems of valves 24 and 25 respectively. Positioned at the opposite side of the rocker arm shaft and integrally formed with rocker arm 60 are a pair of valve tappets 69 and 70 adapted to contact the stems of valves 36 and 33 respectively. The valves are each provided with springs to return the valves to a closed position upon release from the valve tappets in the usual manner. As will be observed in Figure 4, the tappet 67 is offset downwardly with respect to the tappet 68 so that valve 24 is opened prior to valve 25.

The innermost rocker arm 50 includes oppositely extending portions which pivotally support rollers 51 and 52. The rollers and the arm supporting the same are offset axially of the rocker arm shaft with respect to each other, so that roller 51 bears against the innermost cam 18 on the crankshaft 5, and the roller 52 bears against the cam 19 on the crankshaft (see Figure 5). The rocker arm portion which supports the roller 52 carries a valve tappet 53 arranged to abut the upper end of the stem of valve 30, and a similarly formed valve tappet 54 is arranged on the opposite rocker arm portion to abut the stem of valve 22.

Referring back to the treadle controlled piston 63, it will be understood that an upward movement of this piston will swing the rocker arm 60 and open valves 24 and 25 in sequence. At the time that this action occurs the rocker arm 50 may be positioned as shown in Figure 6, wherein the valve tappet 54 has effected an opening of valve 22. The opening of valve 22 is determined by the contour of the cam 18 which bears against the roller 51. As heretofore described, this valve action sequentially effects a release of the brake and an engagement of the clutch, and thus a rotation of the crankshaft 5. As the crankshaft 5 is rotated, the high portion on the cam 20 (see Figure 10) maintains through roller 66 the valve 25 in its lowered position, and automatically relieves the treadle controlled piston 63 of any further action in working the valves. As the crankshaft 5 continues its rotation through 360° to complete a cycle of machine movement, the contour of the cams 18, 19 and 20 will carry out the valve actuation and resulting clutch and brake operation heretofore described. It will be understood by those skilled in the art that it is not essential that the cams 18, 19 and 20 be connected directly to the crankshaft as shown, but it is only essential that they be connected to some part of the machine which moves in timed relation to the crankshaft in order to carry out the valve actuation described.

The brake mechanism generally referred to at 15 is preferably constructed according to the disclosure and claims of my copending application Serial No. 64,530, filed February 18, 1936, wherein a cylinder 70 having a piston 71 positioned therein is provided with a connecting rod 72 to transmit the piston movements to the brake band 14. A spring 73 is positioned to surround the connecting rod 72 and normally urge the piston to its upward limit within the cylinder. The brake band 14 is anchored at one end directly through link 74 to the brake cylinder block, and is positioned to surround the brake drum 13 and be connected through adjusting device 75 to the piston rod 72. The spring 73 within the brake cylinder 70 is proportioned to move the piston upwardly and apply the brake upon the exhaustion of the air from the cylinder above the piston.

In a brake constructed according to said copending application all massive levers and other actuating devices which might exert a retarding inertia effect are dispensed with to provide a quick acting positive brake. Upon venting of the air in the brake cylinder 70, the spring has only to overcome the inertia of the piston and piston rod to draw the brake band tightly about the drum 13. Preferably the band 14 is wrapped about the drum 13 to effect a self-energizing of the brake and said self-energizing effect supplements the action of the spring to quickly and positively "snap" into a braking position. In the combination with a forging machine having a cycle of movement as outlined above, the brake drum 13 is stationary at the time of brake release, and thus the self-energizing effect of the brake may not adversely effect the releasing action of the brake. In releasing the brake the admission of air into the cylinder 70 overcomes the compression of the spring 73 and quickly forces the piston 71 and rod 72 downwardly to release the brake.

The plunger or piston 71 may be limited in its downward movement within the cylinder 70 by an abutment shoulder 78 formed within the cylinder and the compression of the spring 73. The spring 73 surrounding the piston rod 72 is supported within the cylinder upon a shouldered disc 76 and said disc in turn is supported by adjusting devices 77 depending from the cylinder wall. Through the adjustment of the means 77 disposed beneath the disc 76 the tension of the spring 73 may be adjusted and thus the action of the brake band 14 may be controlled within certain limits by spring adjustment irrespective of variations in air pressure within the cylinder. The adjustment between the brake band 14 and the piston rod as at 75 is preferably arranged to limit the upward movement of the piston and prevent violent bottoming of the same against the cylinder head.

As heretofore described in connection with the description of the valve actuation and the effects thereof, it is pointed out that at the initiation of the forging machine cycle sixty pounds of air pressure is applied to initiate the brake movement, and that subsequently the brake cylinder is exhausted to a thirty pound pressure. Among the advantages flowing from the application of two different pressures to the brake cylinder is one relating to quick or "snappy" brake action. The sixty pounds applied to the brake at the initiation of the forging movement quickly releases the brake band from the drum 13. In other words, sixty pounds of air pressure is available to overcome the inertia of the piston 71, rod 72 and compress the spring. Subsequent to the compression on the spring and after the piston 71 has bottomed against shoulder 78 in the cylinder 70, a thirty pound pressure is available to hold the spring compressed. The thirty pound pressure is ample to hold the brake disengaged, and upon completion of the forging machine cycle the action of the spring 73 in moving the piston upwardly is faster against the thirty pound exhaustion than would be possible against a sixty pound exhaustion. The valve mechanism thus provides a sixty pound disengaging pressure to effect a quick brake disengagement and a thirty pound evacuation by the spring 73 to effect a quick brake engagement. Referring back to the valve arrangement and the sequential action, it will be noted that the opening of valve 30 performs two related functions in that it reduces clutch engaging pressure to make overload slippage possible and at the same time reduces brake disengaging pressure to make quicker brake engaging action possible.

The relation between the braking action and the clutch engaging action becomes important when it is appreciated that the brake should be positively released prior to any clutch engagement and that the clutch engagement in turn should be positively released prior to any braking action in order to prevent excessive wear in the clutch and/or the brake. For a rapid and efficient operation of the machine there should be no lapse of time between the release of the brake and application of the clutch. A slow acting brake, that is, one which does not fully release prior to clutch engagement, places an added load upon the clutch at a time when it is overcoming the inertia of the header slide, crank and gripping die mechanism. A slow acting brake also produces excessive wear on the clutch surfaces as the machine approaches the end of the cycle of machine movement in that to stop the machine on back center the slow acting brake must be applied prior to a complete release of the clutch. From the foregoing it will be seen that to insure long life in the clutch engaging parts and in the friction material of the brake band, both the clutch and the brake should have a quick positive action that will not involve any overlapping in their application. The above mentioned quick positive brake action is effected according to my invention by the application of a high air pressure to release the brake and a substantial reduction of this air pressure prior to the time that the brake is applied. In conjunction with the advantages provided by the two pressure braking control I avail myself of the advantages in clutch and brake timing as described and claimed in its broader aspects in my copending application Serial No. 64,530, filed February 18, 1936.

In the operation of a forging machine equipped with a clutch and brake assembly constructed according to my invention the treadle T is depressed by the machine operator when the header slide is at a position remote from the gripping dies. The treadle depression admits air beneath the treadle controlled piston 63 to open a valve admitting air at sixty pounds into the brake 15 to release the brake and thereafter opens a valve admitting air at sixty pounds to the clutch 11a. Clutch engagement transmits the rotation of the flywheel 11 to the crankshaft 5 and the header slide moves forward toward the gripping dies. During the forward movement of the header slide the cams 18, 19 and 20 on the end of the crankshaft operate to carry out the valve actuation heretofore described. The effect of the valve actuation is to reduce the clutch engaging pressure substantially and reduce the air pressure in the brake 15 by the same amount. The result of this action is that the clutch is responsive to slip under overload and that the brake may more quickly respond to effect brake engagement. As the forging machine nears the end of a cycle on 360° of crankshaft rotation, the cams 18, 19 and 20 automatically release the clutch and apply the brake to bring the machine to a stop at a back center position in readiness for the next cycle.

Although I have illustrated and described my invention in the environment of a forging machine, I expect those skilled in the art to appreciate that the principles of the clutch or brake may be well suited to other uses. It will also be understood that fluid pressure actuating mediums other than air, such as for instance, liquid may be employed.

While I have illustrated and described an embodiment of my invention and referred to particular details such as, for instance, thirty pounds pressure and sixty pounds pressure, I wish to be limited neither to the embodiment shown nor the specific details referred to, since many departures therefrom may be made without departing from the spirit of the invention.

I claim:

1. In a forging machine having a reciprocating header slide and a shaft provided with eccentric means to reciprocate the header slide upon shaft rotation, a flywheel rotatably mounted upon said shaft and a friction clutch arranged intermediate said flywheel and shaft to rotate said shaft upon clutch actuation, means operating in timed relation to the header slide movement connected to said clutch to provide a greater clutch engaging pressure during the initiation of the working stroke and a relatively lower clutch engaging pressure at the termination of the working stroke.

2. In a forging machine having an air operated friction clutch, a high pressure air supply means and a low pressure air supply means, means operating in timed relation to the machine to successively conduct air from said high pressure supply to said clutch and from said low pressure supply to said clutch to render said clutch responsive to overload slippage during a cycle of the machine.

3. In a machine having a rotating shaft, a brake means therefor comprising an air cylinder having a plunger urged in one direction by means of a spring, a brake band operatively connected to said plunger and moved to braking position by said spring, means feeding air at a high pressure into said cylinder to overcome the inertia of the plunger and compress the spring to release the brake, means to substantially reduce the pressure within said cylinder subsequent to brake release and prior to a brake application effected by exhausting the air in said cylinder.

4. In a machine having an air clutch and an air brake, a control means having a plurality of air inlets and conduits leading to said clutch and brake, a plurality of valves arranged to successively admit air from one of said inlets to said brake and to said clutch, to partially exhaust said air from said brake and clutch, and thereafter completely exhaust the air from said clutch and said brake.

5. That method of coordinating a clutch and brake assembly in a machine which comprises the application of high brake disengaging pressure and the application of high clutch engaging pressure at the initiation of the working stroke and the application of lower brake disengaging pressures and lower clutch engaging pressures at the termination of the working stroke whereby the clutch is rendered responsive to overload slippage near the end of the working stroke and the brake is rendered more responsive to brake actuation subsequent to the working stroke.

6. In a forging machine having a header slide and an air clutch and an air brake, a control mechanism therefor comprising a plurality of valves interconnected by chambers and a plurality of cams moved in timed relation to the header slide positioned to actuate said valves whereby air at a high pressure is lead sequentially to said brake and said clutch and thereafter the air in said clutch and brake is partially exhausted by said valves and whereby thereafter the air is entirely exhausted from said clutch and brake.

7. In a machine having a header slide and an air brake and air clutch, mechanism to control the pressures and actuation of said clutch and brake comprising air supply means at a high pressure and air supply means at a relatively lower pressure, means actuated by the machine operator to admit air from said high pressure means to said brake to release same and to said clutch to engage same, means automatically operating subsequent to said clutch engagement to obstruct admission of air from said high pressure means and open said low pressure means to said clutch and brake to partially exhaust same, means automatically operating subsequent to said last named automatic means to obstruct movement from either of said air supply means and to completely exhaust the air from said clutch and brake means.

8. In a machine, a clutch and brake assembly and control therefor, comprising a treadle manually actuable by the machine operator to admit air under pressure to the brake to release same and immediately thereafter admit air under pressure to the clutch to engage same, cam means operated in timed relation to the action of the machine cooperating with rocker arms and valve tappets to maintain the air admitting action of said treadle during a part of the machine cycle, said cam and rocker arm means operative during another part of the machine cycle to partially exhaust the air from said brake and clutch and further operable toward the end of the machine cycle to completely exhaust the air from said clutch and brake whereby the machine is brought to rest in a position suited for further treadle actuation.

9. In combination, a machine having a reciprocating header slide and a crank shaft to actuate same, a flywheel rotatably mounted on said shaft and a friction clutch to transmit flywheel rotation to said shaft, a brake operatively connected to restrain rotation of said shaft, and control means to actuate and coordinate the clutch and brake action, comprising a high pressure air supply and a low pressure air supply, a treadle manually operable by the machine operator to initiate crankshaft rotation by the admission of air from said high pressure supply to said brake to release same and admission of air from said high pressure supply to aid clutch to engage same, cam and valve means operating in timed relation to said crankshaft rotation to maintain said high pressures in said brake and clutch during a part of the advance of the header slide in its working stroke, said cam and valve means automatically operated to reduce the pressures in said brake and clutch to the pressure of said low pressure supply means as the header slide nears the end of its working stroke and maintains said low pressure in said brake and clutch until they approach the end of the machine cycle, said cam and valve means automatically operable thereafter to sequentially exhaust the air from said clutch and from said brake to stop the machine at the end of the machine cycle.

WILLIAM L. CLOUSE.